H. C. FOSTER.
BEARING BOX.
APPLICATION FILED MAY 3, 1919.
1,349,449.
Patented Aug. 10, 1920.
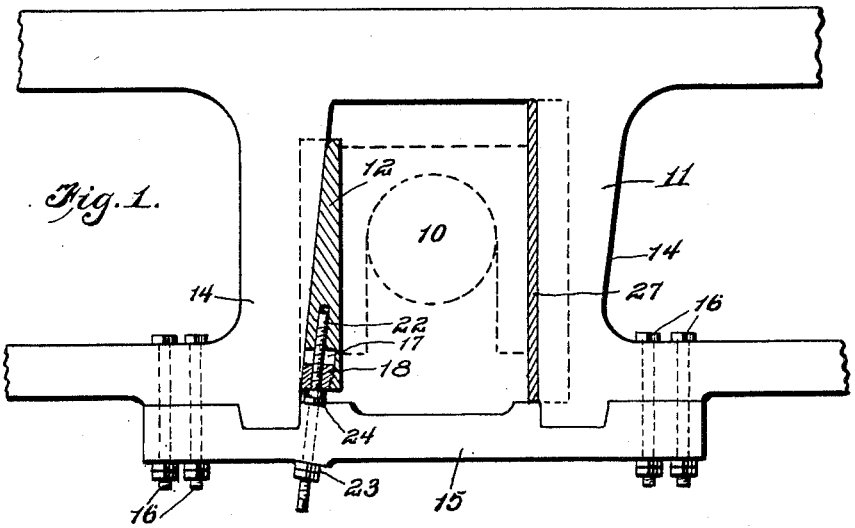
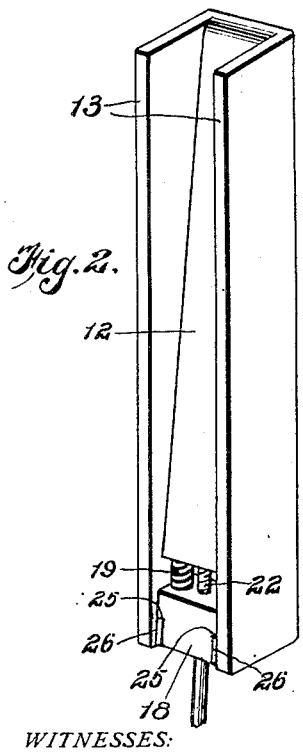
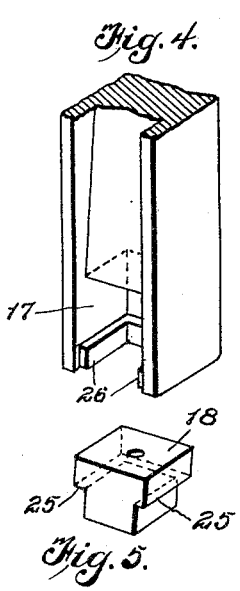
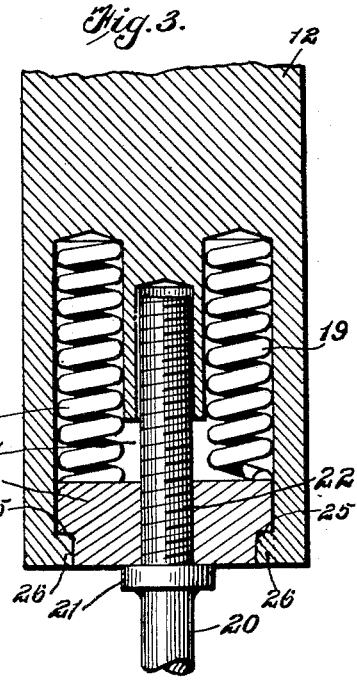
WITNESSES:
L. R. Heinrichs
Marian E. Eisenstein
INVENTOR.
H. C. Foster
BY
ATTORNEY.

UNITED STATES PATENT OFFICE.

HARRY C. FOSTER, OF LEHIGHTON, PENNSYLVANIA, ASSIGNOR OF ONE-HALF TO CHESTER G. SETZER, OF LEHIGHTON, PENNSYLVANIA.

BEARING-BOX.

1,349,449.  Specification of Letters Patent.  Patented Aug. 10, 1920.

Application filed May 3, 1919. Serial No. 294,426.

*To all whom it may concern:*

Be it known that I, HARRY C. FOSTER, a citizen of the United States, residing at Lehighton, in the county of Carbon and State of Pennsylvania, have invented new and useful Improvements in Bearing-Boxes, of which the following is a specification.

The object of the invention is to provide a means for compensating for wear and taking up lost motion in journals such as those employed in connection with locomotive driving wheel axles and the like wherein provision is made for a movement of the journal box in the pedestal or frame of the vehicle under the control of cushioning springs or buffers, and wherein usually such compensation is provided for by the use of a wedge which must be adjusted from time to time and which in the intervals between adjustments permit a vibration which frequently results in damage to the working parts including the breaking of the adjusting bolt or other means employed for that purpose and which except immediately after adjustment fail to perform their intended function in the most satisfactory manner.

With this general object in view the invention consists in providing means whereby the wedge is automatically set up as the wear occurs, while being capable of yielding under unusual strains to eliminate the danger of breakage, and in that connection to provide means of adjustment for the wedge which operates in the direction of movement of the latter so as to dispense with lateral strains in the event of vibration of the wedge due to the movement of the bearing box.

Further objects and advantages of the invention will appear in the course of the following description of a preferred embodiment of the invention, it being understood however that changes in form, proportion and details, to adapt the device for use in connection with journal boxes designed for different purposes, and all within the terms of the appended claims, may be resorted to without departing from the principles involved.

In the drawing:—

Figure 1 is a face view, partly broken away, of a journal or bearing box pedestal, hanger, or frame, the bearing box being indicated in dotted lines.

Fig. 2 is a detail view in perspective of the take up wedge and its related parts disconnected from the bearing.

Fig. 3 is a detail sectional view taken transversely in the plane of the adjustment member, in this instance a bolt, for actuating the follower by which the desired wedge actuating tension is applied to the springs.

Fig. 4 is a detail view in perspective of the lower end of the wedge.

Fig. 5 is a similar view of the follower block.

In connection with the bearing 10 which is indicated in dotted lines in Fig. 1 of the drawing and is shown mounted in a pedestal 11 which may be of any desired construction or may constitute a part of the frame of the vehicle in connection with which the device is employed, there is arranged a wedge 12 provided with flanges 13 which operate upon opposite sides of the pedestal arms 14 which are connected at their lower ends, in the usual manner, by a yoke 15 held in place, for example, by bolts 16. This wedge, as in the ordinary practice, is employed in relation to that side of the bearing box guide which is disposed at an inclination to the path of movement of the bearing blocks, and arranged in a recess 17 in the lower end thereof is a follower block 18 between which and the wedge is located an expansive cushioning and actuating member 19, consisting in the construction illustrated of one or more springs which, being seated at their opposite extremities respectively upon the wedge and the follower block, serve to advance the former in a direction to take up any lost motion between the bearing box and the walls of its guide. The means illustrated for the adjustment of the follower block consists, as shown, of a bolt 20 having a collar 21 and a threaded portion 22 which loosely engages the opening provided for its reception in the block, so that the liability of stripping the threads of the bolt, when strain is applied to the wedge, and is communicated therefrom through the cushioning member to the block, is reduced to the minimum. This bolt is disposed in parallelism with the inclined or beveled wall of the bearing block's guide so that the adjustment of the follower block by means thereof is parallel with the movement of the wedge which is guided by said inclined wall of the guide, and hence vibration of the wedge, due to the movement of the bearing blocks is in alinement with the bolt, and the tendency to strain the latter, and hence to cause fracture thereof, is avoided. The bolt preferably extends through the yoke 15 and is held at the desired adjustment therein, for the purpose of positioning the follower block to apply the desired tension of the cushioning member 19, by means of nuts 23 and 24 disposed respectively in contact with the block and upper surfaces of said yoke. Also the follower block is preferably cut away to form shoulders 25 at three sides for contact with top lugs 26 with which the walls of the recess 17 in the lower end of the wedge are provided.

In practice the follower block by means of the adjusting bolt 20 may be set up to apply the desired tension and hence resistance to the springs constituting the cushioning member, so that while the wedge is permitted under severe strain to move relative to the guide and under the influence of the bearing blocks, it automatically takes up any lateral lost motion between the bearing block and its guide which at the side opposite to the wedge may be provided with the usual wear plate 27, and hence whereas periodic adjustments of the follower block may be required the operation of the wedge in preventing lateral vibration of the bearing blocks is effective in the intervals between adjustment, and thus one of the principal disadvantages of the form of wedge now in common use is eliminated.

The outer face of the block 18, which is located at the same side of wedge as the inclined face of the latter is beveled or inclined to lie in the same plane as said inclined face of the wedge. Hence the block may also move in parallelism with the wedge guide to reduce strain and avoid liability of any binding action.

Owing to the fact that the relatively movable elements of the wear compensating device in my construction are free to move in a direct path without tilting or canting and thereby causing resisting strains, an important advantage is obtained, in that the wedge is not liable to bind under expansion when the bearing heats up, but is always free for a reverse or downward movement, thus compensating for expansion and contraction and insuring positive and easy cushioning action of the parts.

Having thus fully described my invention, I claim:—

1. The combination with a movable bearing box and its supporting frame, of a wedge for taking up lost motion, a follower movable independently of the wedge, means for adjusting the follower in the direction of movement of the wedge, and an expansion cushioning member interposed between the follower and the wedge.

2. The combination with a movable bearing box and its guide, one wall of which is inclined to the path of movement of the bearing blocks, of a wedge interposed between the bearing box and said inclined wall of the guide, a follower disposed for movement parallel with that of the wedge and movable independently thereof, expansion motion transmitting and cushioning means interposed between the follower and wedge, and follower adjusting means consisting of a bolt disposed parallel with the inclined wall of the said guide.

3. The combination with a movable bearing box and its guide, of a wedge interposed between the bearing box and one wall of the guide and provided in its larger end with a recess, a follower block disposed for movement in said recess of the wedge, an expansion cushioning member disposed between the follower block and the wedge to exert pressure upon the latter in the direction of its movement, and adjusting means for advancing the follower block in the direction of movement of the wedge.

4. The combination with a movable bearing box and its guide, of a wedge interposed between the bearing box and one wall of its guide, a follower housing in the larger end of the wedge, springs disposed in the housing between said follower block and the wedge for yieldingly advancing the latter relative to the follower block, and an adjusting bolt supported by said guide and engaged with the follower block for movement of the latter to apply tension to said springs.

5. The combination with a movable bearing box and its guide, of a wedge interposed between the bearing box and one wall of its guide, a follower movable independently of the wedge, wedge adjusting and cushioning springs between the follower and the wedge, and adjusting means acting on the follower, said follower and adjusting means being arranged to move in a plane parallel with the inclined face of the wedge, whereby under expansion reverse movement of the wedge is permitted.

In testimony whereof I affix my signature.

HARRY C. FOSTER.